US009212281B2

(12) United States Patent
Weber et al.

(10) Patent No.: US 9,212,281 B2
(45) Date of Patent: *Dec. 15, 2015

(54) BLENDS OF POLYARYLENE ETHERS AND POLYARYLENE SULFIDES

(75) Inventors: Martin Weber, Maikammer (DE); Christian Maletzko, Altrip (DE); Susanne Zeiher, Ludwigshafen (DE); Mark Völkel, Ladenburg (DE); Norbert Güntherberg, Speyer (DE); Rüdiger Bluhm, Limburgerhof (DE)

(73) Assignee: BASF SE, Ludwigshafen (DE)

(*) Notice: Subject to any disclaimer, the term of this patent is extended or adjusted under 35 U.S.C. 154(b) by 297 days.

This patent is subject to a terminal disclaimer.

(21) Appl. No.: 13/515,894

(22) PCT Filed: Dec. 14, 2010

(86) PCT No.: PCT/EP2010/069646
§ 371 (c)(1),
(2), (4) Date: Jun. 14, 2012

(87) PCT Pub. No.: WO2011/073197
PCT Pub. Date: Jun. 23, 2011

(65) Prior Publication Data
US 2012/0296031 A1  Nov. 22, 2012

(30) Foreign Application Priority Data

Dec. 17, 2009 (EP) .................................. 09179656

(51) Int. Cl.
| C08G 18/42 | (2006.01) |
| C08F 283/00 | (2006.01) |
| C08G 65/48 | (2006.01) |
| C08L 81/06 | (2006.01) |

(52) U.S. Cl.
CPC ............. *C08L 81/06* (2013.01); *C08G 2650/40* (2013.01); *C08L 2205/02* (2013.01)

(58) Field of Classification Search
None
See application file for complete search history.

(56) References Cited

U.S. PATENT DOCUMENTS

| 2,513,188 | A | 6/1950 | Macallum |
| 3,354,129 | A | 11/1967 | Edmonds et al. |
| 3,699,087 | A | 10/1972 | Wood et al. |
| 4,645,826 | A | 2/1987 | Iizuka et al. |
| 5,502,122 | A | 3/1996 | Weber et al. |
| 2011/0155309 | A1 | 6/2011 | Steininger et al. |
| 2011/0201747 | A1 | 8/2011 | Weber et al. |
| 2011/0218294 | A1 | 9/2011 | Weber et al. |
| 2011/0224386 | A1 | 9/2011 | Weber et al. |
| 2011/0237693 | A1 | 9/2011 | Weber et al. |
| 2011/0237694 | A1 | 9/2011 | Weber et al. |
| 2011/0251337 | A1 | 10/2011 | Weber et al. |
| 2011/0294912 | A1 | 12/2011 | Weber et al. |
| 2011/0318524 | A1 | 12/2011 | Jakobi et al. |
| 2012/0029106 | A1 | 2/2012 | Weber et al. |
| 2012/0083541 | A1 | 4/2012 | Khvorost et al. |
| 2012/0083579 | A1 | 4/2012 | Weber et al. |
| 2012/0108693 | A1 | 5/2012 | Gibon et al. |
| 2012/0149796 | A1 | 6/2012 | Weber et al. |

FOREIGN PATENT DOCUMENTS

| EP | 185237 | A1 | 6/1986 |
| EP | 673973 | A1 | 9/1995 |
| EP | 855 428 | A1 | 7/1998 |
| EP | 0855 429 | A1 | 7/1998 |
| EP | 903 376 | A2 | 3/1999 |
| GB | 962941 | A | 7/1964 |
| JP | H02-311543 | A | 12/1990 |
| JP | H03-200870 | A | 9/1991 |
| JP | H11-043603 | A | 2/1999 |

OTHER PUBLICATIONS

U.S. Appl. No. 13/515,905.
U.S. Appl. No. 13/267,493.
Translation of EP 0 903 376.
Translation of EP 0 855 429.
Translation of EP 0 855 428.
International Search Report for PCT/EP2010/069644 mailed Jan. 28, 2011.
International Preliminary Report on Patentability for PCT/EP2010/069644 mailed Mar. 21, 2011.
International Preliminary Report on Patentability from PCT/EP2010/069646 dated Jul. 30, 2012.
International Search Report for PCT/EP2010/069646 mailed Jan. 28, 2011.
International Preliminary Report on Patentability for PCT/EP2010/069646 mailed Mar. 23, 2012.
English Translation of Japanese Office Action dated Jul. 22, 2014 for Japanese Application No. 2012-543691.

*Primary Examiner* — Susannah Chung
*Assistant Examiner* — Robert T Butcher
(74) *Attorney, Agent, or Firm* — Drinker Biddle & Reath LLP

(57) ABSTRACT

The present invention relates to thermoplastic molding materials comprising the following components:
(A) at least one polyarylene ether,
(B) at least one polyarylene sulfide,
(C) optionally at least one functionalized polyarylene ether comprising carboxyl groups,
(D) at least one fibrous or particulate filler and
(E) optionally further additives and/or processing assistants, the ratio of the apparent viscosity of the component (A) to that of the component (B), determined at 350° C. and a shear rate of 1150 s$^{-1}$, being from 2.5 to 3.7.

16 Claims, No Drawings

US 9,212,281 B2

BLENDS OF POLYARYLENE ETHERS AND POLYARYLENE SULFIDES

CROSS-REFERENCE TO RELATED APPLICATIONS

This application is a national stage application (under 35 U.S.C. §371) of PCT/EP2010/069646, filed Dec. 14, 2010, which claims benefit of European Application 09179656.5, filed Dec. 17, 2009.

The present invention relates to thermoplastic molding materials comprising the following components:
(A) at least one polyarylene ether,
(B) at least one polyarylene sulfide,
(C) optionally at least one functionalized polyarylene ether comprising carboxyl groups,
(D) at least one fibrous or particulate filler and
(E) optionally further additives and/or processing assistants,
the ratio of the apparent viscosity of the component (A) to that of the component (B), determined at 350° C. and a shear rate of 1150 s$^{-1}$, being from 2.5 to 3.7.

In addition, the present invention relates to a process for the preparation of the thermoplastic molding materials according to the invention and the use of the thermoplastic molding materials according to the invention for the production of shaped articles.

Polyarylene ethers belong to the group consisting of the high-performance thermoplastics and, on account of their high heat distortion resistance and resistance to chemicals, are used in applications subject to high stress. Polyarylene ethers are amorphous and therefore often have insufficient resistance with respect to aggressive media. Furthermore, polyarylene ethers also have a high melt viscosity, which in particular has an adverse effect on the processing to give large shaped articles by means of injection molding. The high melt viscosity is particularly disadvantageous in the preparation of molding materials having a high filler or fiber load.

EP-A 673 973 discloses that polymer blends of polyarylene ethers and polyphenylene sulfide have improved flowability and good resistance to chemicals.

EP-A 855 428 discloses rubber-containing polyarylene ethers which comprise functionalized polyarylene ethers containing carboxyl groups and intended for improving the toughness and resistance to chemicals.

EP-A 855 429 discloses thermoplastic molding compositions with improved chemical resistance, comprising polyarylene ethers, polyarylene sulfide and carboxyl-containing functionalized polyarylene ethers.

EP-A 903 376 relates to thermoplastic molding materials comprising polyarylene ethers, polyarylene sulfide and rubber, which likewise additionally comprise functionalized polyarylene ethers. The functionalized polyarylene ethers used in EP-A 903 376 are, however, often inadequate with regard to their suitability for reinforced molding materials.

However, the polyarylene ethers used in the examples of EP-A 903 376, EP-A 855 429 and EP-A 673 973, and the polyarylene sulfide used in each case, give rise to a ratio of apparent viscosity (350° C., 1150 s$^{-1}$) which is much higher than that of the inventive molding compositions, namely in the region of 4.1 or 8.1. The filled, in particular fiber-reinforced, thermoplastic molding materials disclosed in the prior art and based on polyarylene ethers and polyarylene sulfides often have inadequate mechanical properties, in particular an inadequate impact strength and tensile strength. Moreover, the resistance of the known molding materials to chemicals is often insufficient.

It was accordingly the object of the present invention to provide thermoplastic molding materials which are based on polyarylene ethers having good processability and which do not have the abovementioned disadvantages or do so to a lesser extent. In particular, thermoplastic molding materials should have good processability, in particular good flowability, in combination with good mechanical properties, in particular high toughness, high impact strength and a high tensile strength. The thermoplastic molding materials should moreover have a high resistance to chemicals.

The abovementioned objects are achieved by the thermoplastic molding materials according to the invention. Preferred embodiments are described in the claims and the following description. Combinations of preferred embodiments do not depart from the scope of the present invention.

The thermoplastic molding materials according to the invention comprise the following components:
(A) at least one polyarylene ether,
(B) at least one polyarylene sulfide,
(C) optionally at least one functionalized polyarylene ether comprising carboxyl groups,
(D) at least one fibrous or particulate filler and
(E) optionally further additives and/or processing assistants,
the ratio of the apparent viscosity of the component (A) to that of the component (B), determined at 350° C. and a shear rate of 1150 s$^{-1}$, being from 2.5 to 3.7, preferably from 2.6 to 3.5, particularly preferably from 2.7 to 3.3.

In the context of the present invention, the apparent viscosity is in principle determined at 350° C. and a shear rate of 1150 s$^{-1}$ using a capillary viscometer with a circular capillary having a length of 30 mm, a radius of 0.5 mm, and a nozzle inflow angle of 180°, a diameter of the melt reservoir vessel of 12 mm and with a preheating time of minutes.

The polyarylene ethers of component (A) preferably differ from those of optional component (C), and they are especially not functionalized with carboxyl groups.

The thermoplastic molding materials according to the invention preferably comprise from 15 to 80% by weight of the component (A), from 5 to 70% by weight of the component (B), from 0 to 15% by weight of the component (C), from 15 to 70% by weight of the component (D) and from 0 to 40% by weight of the component (E), the sum of the % by weight of the components (A) to (E) being 100% by weight.

The thermoplastic molding materials according to the invention particularly preferably comprise from 15 to 65% by weight of the component (A), from 10 to 55% by weight of the component (B), from 0 to 10% by weight of the component (C), from 25 to 60% by weight of the component (D) and from 0 to 30% by weight of the component (E), the sum of the % by weight of the components (A) to (E) being 100% by weight.

The thermoplastic molding materials according to the invention very particularly preferably comprise from 20 to 54% by weight of the component (A), from 15 to 49% by weight of the component (B), from 1 to 10% by weight of the component (C), from 30 to 60% by weight of the component (D) and from 0 to 30% by weight of the component (E), the sum of the % by weight of the components (A) to (E) being 100% by weight.

The individual components are explained in more detail below.

Component A

Polyarylene ethers are known to the person skilled in the art as a polymer class. In principle, all polyarylene ethers which are known to the person skilled in the art and/or can be prepared by known methods are suitable as a constituent of the component (A).

Polyarylene ethers preferred for the component (A) are composed of building blocks of the general formula I:

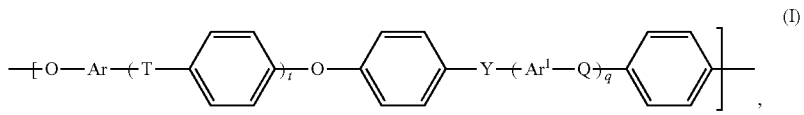

in which the symbols t, q, Q, T, Y, Ar and $Ar^1$ have the following meanings:

t, q: independently of one another, 0, 1, 2 or 3,

Q, T, Y: independently of one another, in each case a chemical bond or a group selected from —O—, —S—, —$SO_2$—, S=O, C=O, —N=N— and —$CR^aR^b$—, in which $R^a$ and $R^b$, independently of one another, are each a hydrogen atom or a $C_1$-$C_{12}$-alkyl, $C_1$-$C_{12}$-alkoxy or $C_6$-$C_{18}$-aryl group, and in which at least one of Q, T and Y is —$SO_2$—, and Ar, $Ar^1$: independently of one another, an arylene group having 6 to 18 carbon atoms.

If, under the abovementioned preconditions, Q, T or Y is a chemical bond, then this is to be understood as meaning that the group adjacent on the left and that adjacent on the right are present directly linked to one another via a chemical bond.

However, Q, T and Y in formula I, independently of one another, are preferably selected from —O— and —$SO_2$—, with the proviso that at least one of the group consisting of Q, T and Y is —$SO_2$—.

If Q, T or Y is —$CR^aR^b$—, $R^a$ and $R^b$, independently of one another, are each a hydrogen atom or a $C_1$-$C_{12}$-alkyl, $C_1$-$C_{12}$-alkoxy or $C_6$-$C_{18}$-aryl group.

Preferred $C_1$-$C_{12}$-alkyl groups comprise straight-chain and branched, saturated alkyl groups having 1 to 12 carbon atoms. In particular, the following radicals may be mentioned: $C_1$-$C_6$-alkyl radical, such as methyl, ethyl, n-propyl, i-propyl, n-butyl, sec-butyl, 2- or 3-methylpentyl and longer-chain radicals such as straight-chain heptyl, octyl, nonyl, decyl, undecyl, lauryl and the singly or multiply branched analogs thereof.

Suitable alkyl radicals in the abovementioned $C_1$-$C_{12}$-alkoxy groups which can be used are the alkyl groups having 1 to 12 carbon atoms, which are defined further above. Preferably useable cycloalkyl radicals comprise in particular $C_3$-$C_{12}$-cycloalkyl radicals, such as, for example, cyclopropyl, cyclobutyl, cyclopentyl, cyclohexyl, cycloheptyl, cyclooctyl, cyclopropylmethyl, cyclopropylethyl, cyclopropylpropyl, cyclobutylmethyl, cyclobutylethyl, cyclopentylethyl, -propyl, -butyl, -pentyl, -hexyl, cyclohexylmethyl, -dimethyl, and -trimethyl.

Ar and $Ar^1$, independently of one another, are a $C_6$-$C_{18}$-arylene group. Starting from the starting materials described further below, Ar is preferably derived from an electron-rich aromatic substance which can easily be electrophilically attacked and is preferably selected from the group consisting of hydroquinone, resorcinol, dihydroxynaphthalene, in particular 2,7-dihydroxynaphthalene, and 4,4'-bisphenol. Preferably, $Ar^1$ is an unsubstituted $C_6$- or $C_{12}$-arylene group.

Suitable $C_6$-$C_{18}$-arylene groups Ar and $Ar^1$ are in particular phenylene groups, such as 1,2-, 1,3- and 1,4-phenylene, naphthylene groups, such as, for example, 1,6-, 1,7-, 2,6- and 2,7-naphthylene, and the arylene groups derived from anthracene, phenanthrene and naphthacene.

In the preferred embodiment according to formula I, Ar and $Ar^1$, independently of one another, are preferably selected from the group consisting of 1,4-phenylene, 1,3-phenylene, naphthylene, in particular 2,7-dihydroxynaphthylene, and 4,4'-bisphenylene.

Building blocks preferably present in the component (A) are those which comprise at least one of the following repeating structural units Ia to Io:

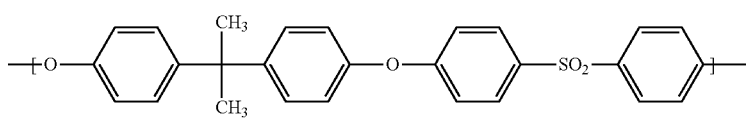

Ia

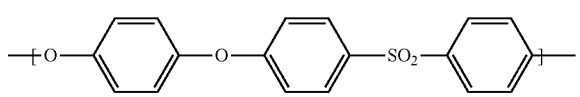

Ib

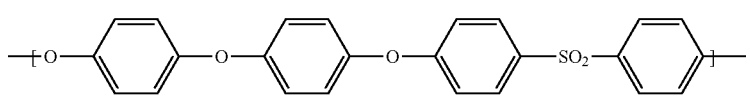

Ic

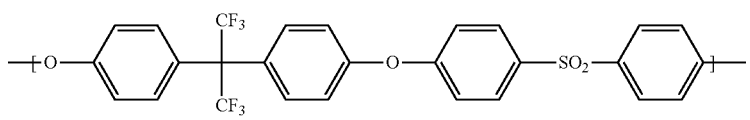

Id

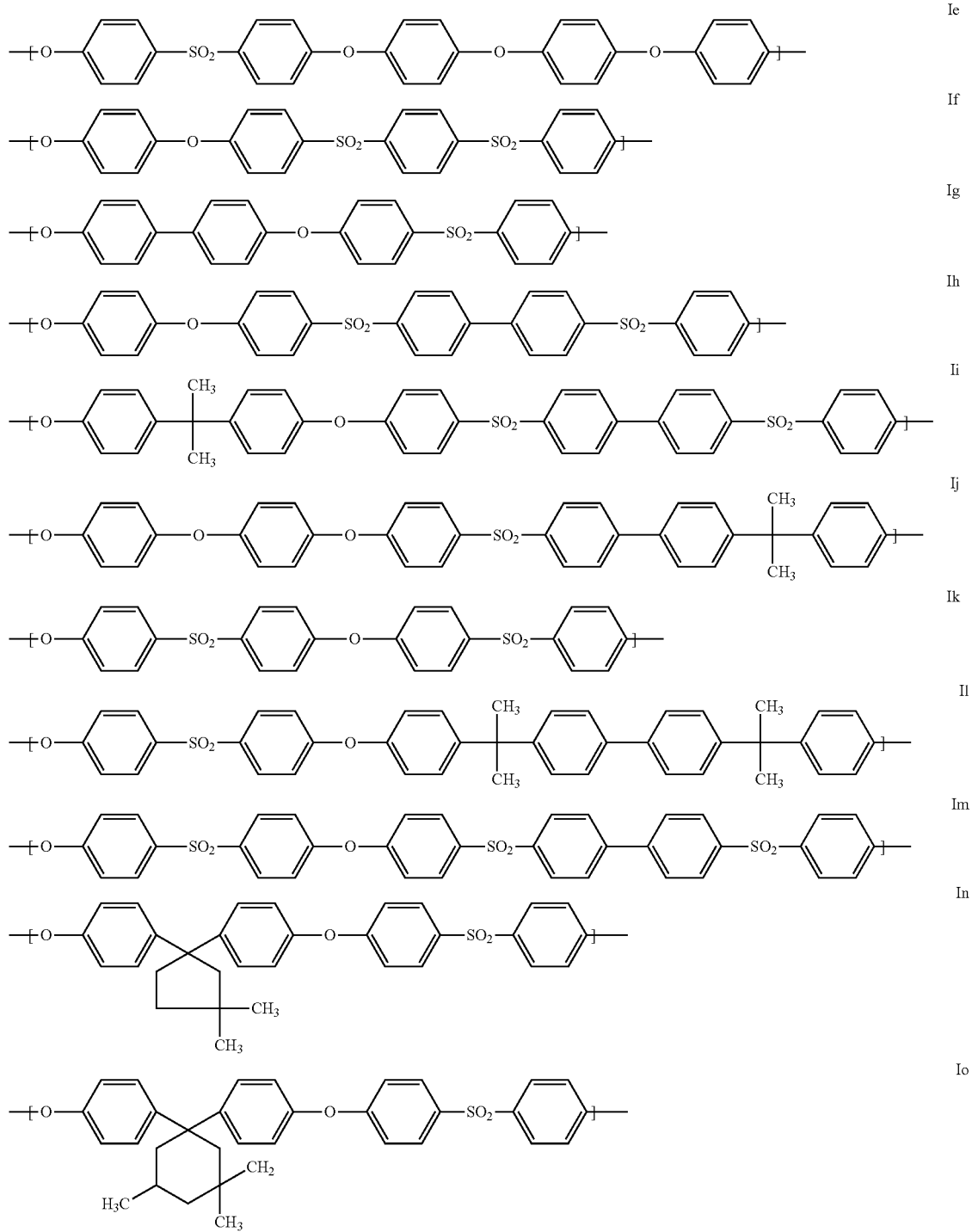

In addition to the preferably present building blocks Ia to Io, those building blocks in which one or more 1,4-phenylene units which originate from hydroquinone are replaced by 1,3-phenylene units which originate from resorcinol or by naphthylene units which originate from dihydroxynaphthalene are also preferred.

Particularly preferred as building blocks of the general formula I are the building blocks Ia, Ig and Ik. It is also particularly preferred if the polyarylene ethers of the component (A) are composed substantially of one type of building block of the general formula I, in particular of a building block selected from Ia, Ig and Ik.

In a particularly preferred embodiment, Ar is 1,4-phenylene, t=1, q=0, T is a chemical bond and Y=$SO_2$. Particularly preferred polyarylene ether sulfones composed of the abovementioned repeating unit are designated as polyphenylene sulfone (PPSU).

In a further, particularly preferred embodiment, Ar is 1,4-phenylene, t=1, q=0, T=C(CH$_3$)$_2$ and Y=SO$_2$. Particularly preferred polyarylene ether sulfones composed of the abovementioned repeating unit are designated as polysulfone (PSU).

In a further, particularly preferred embodiment, Ar is 1,4-phenylene, t=1, q=0, T=Y=SO$_2$. Particularly preferred polyarylene ether sulfones composed of the abovementioned repeating unit are designated as polyether sulfone (PESU). This embodiment is very particularly preferred.

Abbreviations such as PPSU, PESU and PSU correspond in the context of the present invention to DIN EN ISO 1043-1:2001.

In general, the preferred polyarylene ethers (A) have average molecular weights M$_n$ (number average) in the range from 5000 to 60 000 g/mol and relative viscosities of from 0.20 to 0.95 dl/g. The relative viscosities of the polyarylene ethers (A) are determined in 1% strength by weight N-methylpyrrolidone solution at 25° C. according to DIN EN ISO 1628-1 or, if in an exceptional case there is insufficient solubility in N-methylpyrrolidone, in mixtures of phenol and dichlorobenzene or in 96% strength sulfuric acid.

The polyarylene ethers (A) of the present invention preferably have weight average molecular weights M$_w$ of from 10 000 to 150 000 g/mol, in particular from 15 000 to 120 000 g/mol, particularly preferably from 18 000 to 100 000 g/mol, determined by means of gel permeation chromatography in the solvent dimethylacetamide against polymethyl methacrylate having a narrow distribution as standard.

The apparent viscosity of the component (A) is preferably from 100 to 500 Pa·s, in particular from 200 to 400 Pa·s, particularly preferably from 250 to 350 Pa·s, at 350° C. and a shear rate of 1150 s$^{-1}$.

Preparation processes which lead to the abovementioned polyarylene ethers are known to the person skilled in the art and are described, for example, in Herman F. Mark, "Encyclopedia of Polymer Science and Technology", third edition, volume 4, 2003, on pages 2 to 8, and in Hans R. Krichelsdorf, "Aromatic Polyethers" in: Handbook of Polymer Synthesis, second edition, 2005, on pages 427 to 443.

The reaction of at least one aromatic compound having two halogen substituents and at least one aromatic compound having two functional groups, which are reactive toward the abovementioned halogen substituents, in aprotic polar solvents in the presence of anhydrous alkali metal carbonate, in particular sodium, potassium, calcium carbonate or mixtures thereof, is particularly preferred, potassium carbonate being very particularly preferred. A particularly suitable combination is N-methylpyrrolidone as solvent and potassium carbonate as base.

Preferably, the polyarylene ethers have either halogen terminal groups, in particular chlorine terminal groups, or etherified terminal groups, in particular alkyl ether terminal groups, which are obtainable by reacting the OH or phenolate terminal groups with suitable etherifying agents.

Suitable etherifying agents are, for example, monofunctional alkyl or aryl halide, for example C$_1$-C$_6$-alkyl chloride, bromide or iodide, preferably methyl chloride, or benzyl chloride, bromide or iodide or mixtures thereof. Preferred terminal groups in the polyarylene ethers of the component (A) are halogen, in particular chlorine, alkoxy, in particular methoxy, aryloxy, in particular phenoxy, or benzyloxy.

Component B

The molding materials according to the invention comprise, as component (B), at least one polyarylene sulfide. In principle, all polyarylene sulfides are suitable as component (B).

Preferably, the polyarylene sulfides of the component (B) comprise from 30 to 100% by weight of repeating units according to the general formula —Ar—S—, in which —Ar— is an arylene group having 6 to 18 carbon atoms.

Polyarylene sulfides which comprise at least 30% by weight, in particular at least 70% by weight, of repeating units III

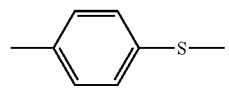
(III)

based on the total weight of all the repeating units, are preferred. Suitable further repeating units are in particular

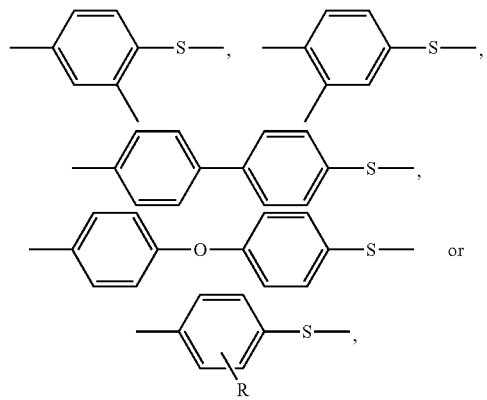

in which R is C$_1$- to C$_{10}$-alkyl, preferably methyl. The polyarylene sulfides may be homopolymers, random copolymers or block copolymers, homopolymers (identical repeating units) being preferred. Very particularly preferred polyarylene sulfides consist of 100% by weight of repeating units according to the general formula III. Component (B) is therefore particularly preferably a polyphenylene sulfide, in particular poly(1,4-phenylene sulfide).

Suitable terminal groups of the polyarylene sulfides used according to the invention are in particular halogen, thiol or hydroxy, preferably halogen.

The polyarylene sulfides of the component (B) may be branched or straight-chain. Preferably, the polyarylene sulfides of the component (B) are straight-chain, i.e. not branched.

The polyarylene sulfides of the component (B) preferably have weight average molecular weights of from 5000 to 100 000 g/mol.

The apparent viscosity of the component (B) at 350° C. and a shear rate of 1150 s$^{-1}$ is preferably from 25 to 200 Pa·s, in particular from 30 to 150 Pa·s, particularly preferably from 40 to 130 Pa·s, very particularly preferably from 50 to 120 Pa·s.

Such polyarylene sulfides are known per se and can be prepared by known methods. Corresponding preparation methods are described, for example, in Hans R. Krichelsdorf, "Aromatic Polyethers" in: Handbook of Polymer Synthesis, second edition, 2005, on pages 486 to 492.

They can be prepared in particular, as described in U.S. Pat. No. 2,513,188, by reacting haloaromatics with sulfur or metal sulfides. It is also possible to heat the metal salts of thiophenols substituted by halogen (cf. GB-B 962 941). The preferred syntheses of polyarylene sulfides include the reaction of alkali metal sulfides with haloaromatics in solution, as described, for example, in U.S. Pat. No. 3,354,129. Further processes are described in U.S. Pat. No. 3,699,087 and in U.S. Pat. No. 4,645,826.

The ratio, according to the invention, of the apparent viscosities in thermoplastic molding materials based on polyarylene ethers and polyarylene sulfides comprising particulate or fibrous fillers leads to the mechanical properties improved according to the invention in combination with good processability. Without wishing to impose limitations, the perception exists that, owing to the defined viscosity ratio, dispersing of the respective minority component in finely divided form in the matrix takes place or a finely structured co-continuous structure forms.

Component C

According to the invention, the thermoplastic molding materials may comprise at least one functionalized polyarylene ether comprising carboxyl groups.

Preferably, the viscosity number, according to DIN EN ISO 1628-1, of the functionalized polyarylene ethers of the component (C) measured in 1% strength by weight solution in N-methyl-2-pyrrolidone at 25° C. is at least 45 ml/g, particularly preferably at least 46 ml/g, very particularly preferably at least 47 ml/g, in particular at least 48 ml/g.

The use of the polyarylene ethers comprising carboxyl groups having a viscosity number according to DIN EN ISO 1628-1 of more than 65 ml/g, measured in 1% strength by weight solution in N-methyl-2-pyrrolidone at 25° C., leads to a disadvantageous reduction of the flowability without a further improvement in the mechanical properties being obtained. Accordingly, the viscosity number according to DIN EN ISO 1628-1 of the polyarylene ethers of the component (C) preferably has an upper limit and is preferably not more than 65 ml/g, particularly preferably not more than 61 ml/g, in particular not more than 57 ml/g, measured in each case in 1% strength by weight solution in N-methyl-2-pyrrolidone at 25° C.

Preferably, the thermoplastic molding materials according to the invention comprise, as component (C), at least one functionalized polyarylene ether which comprises building blocks of the general formula I as defined above and building blocks of the general formula II:

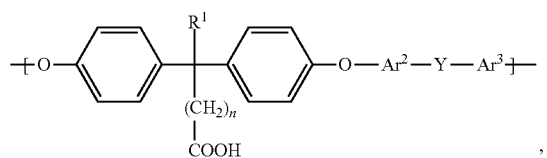

(II)

in which
n is 0, 1, 2, 3, 4, 5 or 6;
$R^1$ is hydrogen, a $C_1$ to $C_6$-alkyl group, or —$(CH_2)_n$—COOH;
$Ar^2$ and $Ar^3$ may be identical or different and, independently of one another, are a $C_6$ to $C_{18}$-arylene group and
Y represents a chemical bond or group which is selected from —O—, —S—, —$SO_2$—, S=O, C=O, —N=N— and —$CR^aR^b$—, in which $R^a$ and $R^b$ may be identical or different and, independently of one another, are each a hydrogen atom or a $C_1$-$C_{12}$-alkyl, $C_1$-$C_{12}$-alkoxy or $C_6$ to $C_{18}$-aryl group.

Preferably, the proportion of building blocks according to the general formula II, based on the sum of the building blocks according to formula I and formula II, is from 0.5 to 3 mol %, preferably from 0.6 to 2 mol %, particularly preferably from 0.7 to 1.5 mol %.

In the present invention, the proportion of building blocks according to the general formula II, based on the sum of the building blocks according to formula I and formula II, is determined in principle by means of $^1$H-NMR spectroscopy using a defined amount of 1,3,5-trimethoxybenzene as an internal standard. The conversion from % by weight to mol % is known to the person skilled in the art.

In the general formula II, n is preferably 2 and $R^1$ is preferably methyl.

In the general formula II, moreover, preferably $Ar^2$=$Ar^3$=1,4-phenylene and Y=—$SO_2$—.

The functionalized polyarylene ethers (component C) used in the molding materials according to the invention are compounds known per se or can be prepared by known processes.

For example, the functionalized polyarylene ethers of component (C) are obtainable on the basis of EP-A-0 185 237 and by the processes described by I. W. Parsons et al., in Polymer, 34, 2836 (1993) and T. Koch, H. Ritter, in Macromol. Phys. 195, 1709 (1994).

The polyarylene ethers are accordingly obtainable in particular by polycondensation of compounds of the general formula IV:

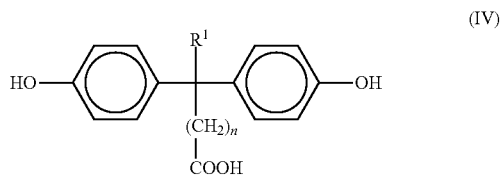

(IV)

in which $R^1$ and n have the abovementioned meanings, with at least one further aromatic compound reactive toward the compounds of the general formula IV, such as, in particular, 4,4'-dichlorodiphenyl sulfone, and optionally further hydroxy-functionalized compounds, such as, for example, bisphenol A and/or bisphenol S and/or 4,4'-dihydroxybiphenyl. Suitable reactants are generally known to the person skilled in the art.

For preparation of the functionalized polyarylene ethers of the component (C), it is also possible in principle to employ the methods used for polyarylene ethers of the component (A), solution polymerization in dipolar aprotic solvents under the action of a base likewise being preferred.

The statements regarding component (A) with respect to the preferred structural elements of the general formula I apply in a corresponding manner to the functionalized polyarylene ethers of the component (C).

In particular, it is preferable if the polyarylene ethers of the components (A) and (C) are structurally similar, in particular are based on the same monomer building blocks and differ only with respect to the building blocks of the general formula II in the component (C). It is particularly preferred if both component (A) and component (C) are based on building blocks of the type PESU as defined above or if both component (A) and component (C) are based on building blocks of the type PPSU as defined above or if both component (A) and component (C) are based on building blocks of the type PSU as defined above. In this context, "based" is to be understood as meaning that both component (A) and component (C) are composed of the same building blocks and differ only in that the component (C) is additionally functionalized and preferably comprises monomer building blocks of the general formula II as defined above. Particularly preferably, the polyarylene ethers of the component (A) and the functionalized polyarylene ethers of the component (C) each comprise the same building blocks of the general formula I.

Suitable building blocks within the framework of the general formula II are in particular:

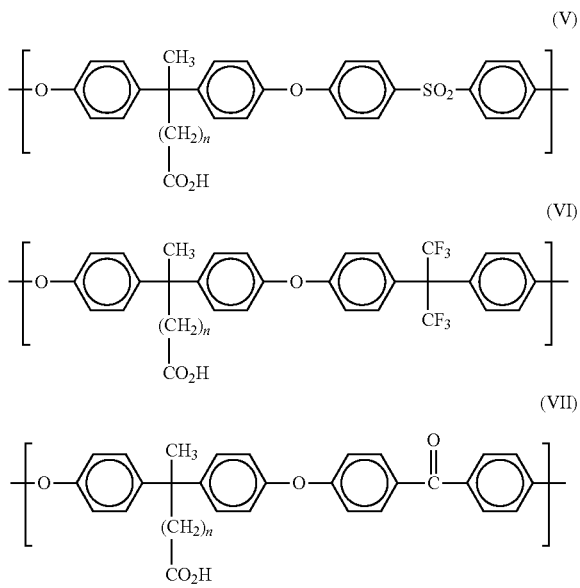

in which n in each case is an integer from 0 to 4. Building block V is very particularly preferred.

Component D

The thermoplastic molding materials of the present invention comprise, as component (D), at least one fibrous or particulate filler, particularly in an amount of from 15 to 70% by weight, particularly preferably from 20 to 70% by weight, in particular from 25 to 65% by weight, based on altogether 100% by weight of the components (A) to (E).

The molding materials according to the invention may comprise in particular particulate or fibrous fillers, fibrous fillers being particularly preferred.

Preferred fibrous fillers are carbon fibers, potassium titanate whiskers, aramid fibers and particularly preferably glass fibers. When glass fibers are used, these can be treated with a size for better compatibility with the matrix material, preferably with a polyurethane size and an adhesion promoter. In general, the carbon fibers and glass fibers used have a diameter in the range from 6 to 20 µm. Component (D) therefore particularly preferably consists of glass fibers.

The incorporation of the glass fibers can be effected both in the form of short glass fibers and in the form of rovings. In the finished injection-molded part, the average length of the glass fibers is preferably in the range from 0.08 to 0.5 mm.

Carbon fibers or glass fibers may also be used in the form of woven fabrics, mats or glass rovings.

Suitable particulate fillers are amorphous silica, carbonates such as magnesium carbonate (chalk), powdered quartz, mica, a very wide range of silicates, such as clays, muscovite, biotite, suzoite, tin maletite, talc, chlorite, phlogophite, feldspar, calcium silicates, such as wollastonite or aluminum silicates such as kaolin, in particular calcined kaolin.

Preferred particulate fillers are those in which at least 95% by weight, preferably at least 98% by weight, of the particles have a diameter (maximum diameter through the geometrical center), determined on the finished product, of less than 45 µm, preferably less than 40 µm, and the so-called aspect ratio thereof is in the range from 1 to 25, preferably in the range from 2 to 20, determined on the finished product. The aspect ratio is the ratio of particle diameter to thickness (maximum dimension to minimum dimension in each case through the geometrical center).

The particle diameters can be determined, for example, by recording electron micrographs of thin sections of the polymer mixture and using at least 25, preferably at least 50, filler particles for the evaluation. Likewise, the determination of the particle diameter can be effected via sedimentation analysis, according to Transactions of ASAE, page 491 (1983). The proportion by weight of the fillers whose diameter is less than 40 µm can also be measured by means of sieve analysis.

Talc, kaolin, such as calcined kaolin or wollastonite or mixtures of two or all of these fillers are particularly preferred as particulate fillers. Among these, talc having a proportion of at least 95% by weight of particles with a diameter of less than 40 µm and an aspect ratio of from 1.5 to 25, determined in each case on the finished product, is particularly preferred. Kaolin preferably has a proportion of at least 95% by weight of particles with a diameter of less than 20 µm and an aspect ratio of from 1.2 to 20, determined in each case on the finished product.

The thermoplastic molding materials can moreover comprise further additives and/or processing assistants as component E.

Component E

The molding materials according to the invention may comprise assistants, in particular processing assistants, pigments, stabilizers, flameproofing agents or mixtures of different additives as constituents of component (E). Customary additives are, for example, also antioxidants, heat stabilizers and UV stabilizers, lubricants and demolding agents, dyes and plasticizers.

The proportion of the component (E) in the molding material according to the invention is in particular from 0 to 30, preferably from 0 to 20, % by weight, in particular 0 to 15% by weight, based on the total weight of the components (A) to (E). If the component E comprises stabilizers, the proportion of these stabilizers is usually up to 2% by weight, preferably from 0.01 to 1% by weight, in particular from 0.01 to 0.5% by weight, based on the sum of the percentages by weight of the components (A) to (E).

Pigments and dyes are generally present in amounts of from 0 to 6, preferably from 0.05 to 5 and in particular from 0.1 to 3% by weight, based on the sum of the percentages by weight of the components (A) to (E).

The pigments for coloring thermoplastics are generally known, cf. for example, R. Gächter and H. Müller, Taschenbuch der Kunststoffadditive, Carl Hanser Verlag, 1983, pages 494 to 510. White pigments such as zinc oxide, zinc sulfide, lead white [2 $PbCO_3 \cdot Pb(OH)_2$], lithopone, antimony white and titanium dioxide, may be mentioned as the first preferred group of pigments. Of the two most commonly used crystal modifications (rutile and anatase type) of titanium dioxide, in particular the rutile form is used for imparting a white color to the molding materials according to the invention. Black colored pigments which may be used according to the invention are iron oxide black ($Fe_3O_4$), spinel black [$Cu(Cr,Fe)_2O_4$], manganese black (mixture of manganese dioxide, silicon dioxide and iron oxide), cobalt black and antimony black and particularly preferably carbon black, which is generally used in the form of furnace black or gas black. In this context, cf. G. Benzing, Pigmente für Anstrichmittel, Expert-Verlag (1988), pages 78 ff.

For establishing certain hues, inorganic colored pigments, such as chromium oxide green or organic colored pigments, such as azo pigments or phthalocyanines, may be used. Such pigments are known to a person skilled in the art.

Antioxidants and heat stabilizers which can be added to the thermoplastic molding materials according to the invention are, for example, halides of metals of group I of the Periodic Table of the Elements, for example sodium, potassium and lithium halides, for example chlorides, bromides or iodides. Furthermore, zinc fluoride and zinc chloride may be used. Sterically hindered phenols, hydroquinones, substituted representatives of this group, secondary aromatic amines, optionally in combination with phosphorus-containing acids or salts thereof, and mixtures of these compounds may furthermore be used, preferably in concentrations up to 1% by weight, based on the sum of the % by weight of the components (A) to (E).

Examples of UV stabilizers are various substituted resorcinols, salicylates, benzotriazoles and benzophenones, which are generally used in amounts of up to 2% by weight.

Lubricants and demolding agents, which as a rule are added in amounts of up to 1% by weight based on the sum of the % by weight of the components (A) to (E), are stearyl alcohol, alkyl stearates and stearamides and esters of pentaerythritol with long-chain fatty acids. It is also possible to use dialkyl ketones, for example distearyl ketone.

As a preferred constituent, the molding materials according to the invention comprise from 0.1 to 2, preferably from 0.1 to 1.75, particularly preferably from 0.1 to 1.5, % by weight and in particular from 0.1 to 0.9% by weight (based on the sum of the % by weight of the components (A) to (E)) of stearic acid and/or stearates. In principle other stearic acid derivatives such as esters of stearic acid may also be used.

Stearic acid is preferably prepared by hydrolysis of fats. The products obtained are usually mixtures of stearic acid and palmitic acid. Such products therefore have a broad softening range, for example, from 50 to 70° C., depending on the composition of the product. Products having a proportion of more than 20, particularly preferably more than 25, % by weight of stearic acid are preferably used. It is also possible to use pure stearic acid (>98%).

Furthermore, component (E) may also comprise stearates. Stearates can be prepared either by reacting corresponding sodium salts with metal salt solutions (for example, $CaCl_2$, $MgCl_2$, aluminum salts) or by direct reaction of the fatty acid with metal hydroxide (cf. for example Baerlocher Additives, 2005). Aluminum tristearate is preferably used.

So-called nucleating agents, such as, for example, talc, are also suitable as further additives.

The sequence in which the components (A) to (E) are mixed is arbitrary.

The molding materials according to the invention can be prepared by methods known per se, for example, extrusion. The molding materials according to the invention can be prepared, for example, by mixing the starting components in customary mixing apparatuses, such as screw extruders, preferably twin-screw extruders, Brabender mixers, Banbury mixers or kneaders, and then effecting extrusion. After the extrusion, the extrudate is cooled and comminuted. The sequence of mixing of the components may be varied. Accordingly, two or more than two components can be premixed, but it is also possible to mix all components together.

Intensive through mixing is advantageous for obtaining a mixture which is as homogeneous as possible. For this purpose, in general average mixing times of from 0.2 to 30 minutes at temperatures of from 290 to 380° C., preferably from 300 to 370° C., are required. After the extrusion, the extrudate is, as a rule, cooled and comminuted.

The thermoplastic molding materials according to the invention can advantageously be used for the production of shaped articles. The molding materials according to the invention are suitable in particular for the production of shaped articles for household articles, electrical or electronic components and for the production of shaped articles for the vehicle sector, in particular the automotive sector.

The following examples explain the invention in more detail without limiting it.

EXAMPLES

The moduli of elasticity, the tensile strength and the elongation at break of the samples were determined in a tensile test according to ISO 527 on dumbbells.

The impact strength of the products was determined on ISO bars according to ISO 179 1 eU.

The flowability was assessed on the basis of the melt viscosity. The melt stability was determined by means of a capillary rheometer. Here, the apparent viscosity of the melt at 350° C. was determined as a function of the shear rate in a capillary viscometer (Göttfert capillary viscometer Rheograph 2003) having a circular capillary of 30 mm length and 0.5 mm radius, a nozzle inflow angle of 180°, a melt reservoir vessel diameter of 12 mm and a preheating time of 5 minutes.

The viscosity number of the polyarylene ethers was determined in 1% strength by weight solution in N-methylpyrrolidone at 25° C. according to DIN EN ISO 1628-1.

The resistance to FAM B was determined by storing ISO bars measuring 80×40×4 mm for seven days at 60° C. in FAM B. Thereafter, the bars were left to dry in the air, then stored for 1 day under reduced pressure and at room temperature and then stored for 2 days under reduced pressure at 100° C. Thereafter, the impact strength was determined according to ISO 179 1 eU.

Component A

A polyether sulfone having a viscosity number of 55.4 ml/g (Ultrason® E 2010 from BASF SE) was used as component A. The product used had 0.12% by weight of Cl terminal groups and 0.18% by weight of $OCH_3$ terminal groups. The apparent melt viscosity determined at 350° C./1150 $s^{-1}$ was 514 Pa·s.

A polyether sulfone having a viscosity number of 49.0 ml/g (Ultrason® E 1010 from BASF SE) was used as component A2. The product used had 0.19% by weight of Cl terminal groups and 0.23% by weight of $OCH_3$-terminal groups. The apparent melt viscosity determined at 350° C./1150 $s^{-1}$ was 263 Pa·s.

A polyether sulfone having a viscosity number of 44.0 ml/g was used as component A3. The product used had 0.21% by weight of Cl terminal groups and 0.33% by weight of $OCH_3$ terminal groups. The apparent melt viscosity determined at 350° C./1150 $s^{-1}$ was 134 Pa·s.

Component B

A poly(1,4-phenylene sulfide) having a melt viscosity of 76 Pa·s determined at 350° C. and a shear rate of 1150 $s^{-1}$ was used as component B1.

A poly(1,4-phenylene sulfide) having a melt viscosity of 68 Pa·s determined at 350° C. and a shear rate of 1150 $s^{-1}$ was used as component B2.

A poly(1,4-phenylene sulfide) having a melt viscosity of 14 Pa·s determined at 350° C. and a shear rate of 1150 $s^{-1}$ was used as component B3.

Component C

A functionalized polyether sulfone which was prepared as follows was used as component C1:

Under nitrogen atmosphere, 577.03 g of dichlorodiphenyl sulfone, 495.34 g of dihydroxydiphenyl sulfone and 5.73 g of 4,4'-bishydroxyphenylvaleric acid ("DPA") were dissolved in 1053 ml of NMP and 297.15 g of anhydrous potassium carbonate were added. The reaction mixture was heated to 190° C. and kept at this temperature for 6 h. Thereafter the batch was diluted with 1947 ml of NMP. After cooling to T<80° C. the suspension was discharged. The insoluble constituents were then separated off by filtration. The solution obtained was then precipitated in water. The white powder obtained was then extracted several times with hot water and then dried at 140° C. under reduced pressure. The proportion of DPA units was determined at 0.9 mol % by means of $^1$H-NMR spectroscopy using 1,3,5-trimethoxybenzene as an internal standard, and the viscosity number of the product was 46.9 ml/g.

Component D

Cut glass fibers having a staple length of 4.5 mm and a fiber diameter of 10 μm, which were provided with a polyurethane size, were used as component D1.

TABLE 1

Properties of the blends of polyarylene ethers and polyarylene sulfides. The composition of the thermoplastic molding materials is stated in parts by weight.

| Experiment | C1 | C2 | C3 | C4 | 5 | 6 | 7 | 8 |
|---|---|---|---|---|---|---|---|---|
| Component A1 | 36 | 31 | 27.5 | 24 | — | — | — | — |
| Component A2 | — | — | — | — | 36 | 31 | 27.5 | 24 |
| Component A3 | — | — | — | — | — | — | — | — |
| Component B1 | 19 | 24 | 27.5 | 31 | 19 | 24 | 27.5 | 31 |
| Component B2 | — | — | — | — | — | — | — | — |
| Component B3 | — | — | — | — | — | — | — | — |
| Component C1 | — | — | — | — | — | — | — | — |
| Component D | 45 | 45 | 45 | 45 | 45 | 45 | 45 | 45 |
| Modulus of elasticity [GPa] | 16.9 | 17.3 | 17.4 | 17.5 | 16.8 | 17.2 | 17.3 | 17.4 |
| Elongation at break [%] | 1.3 | 1.4 | 1.3 | 1.3 | 1.4 | 1.4 | 1.5 | 1.5 |
| Tensile strength [MPa] | 132 | 144 | 142 | 145 | 154 | 154 | 167 | 173 |
| ISO 179 1eU [kJ/m²] | 37 | 36 | 34 | 35 | 36 | 36 | 38 | 39 |
| Viscosity at 1000 s⁻¹ (350° C.) | 681 | 640 | 630 | 625 | 481 | 453 | 445 | 432 |
| ISO 179 1eU [kJ/m²] after storage in FAM B | 16 | 17 | 16 | 16 | 21 | 24 | 26 | 28 |

| Experiment | C9 | C10 | C11 | C12 | C13 | C14 | 15 |
|---|---|---|---|---|---|---|---|
| Component A1 | — | — | — | — | — | — | — |
| Component A2 | — | — | — | — | 27.5 | 27.5 | 22.5 |
| Component A3 | 36 | 31 | 27.5 | 24 | — | — | — |
| Component B1 | 19 | 24 | 27.5 | 31 | — | — | 27.5 |
| Component B2 | — | — | — | — | 27.5 | — | — |
| Component B3 | — | — | — | — | — | 27.5 | — |
| Component C1 | — | — | — | — | — | — | 5 |
| Component D | 45 | 45 | 45 | 45 | 45 | 45 | 45 |
| Modulus of elasticity [GPa] | 16.7 | 17.1 | 17.3 | 17.2 | 16.8 | 17.1 | 17.2 |
| Elongation at break [%] | 0.9 | 0.8 | 0.8 | 0.7 | 1.2 | 1.0 | 1.9 |
| Tensile strength [MPa] | 126 | 128 | 124 | 131 | 142 | 139 | 175 |
| ISO 179 1eU [kJ/m²] | 29 | 31 | 30 | 29 | 32 | 29 | 45 |
| Viscosity at 1000s s⁻¹ (350° C.) | 378 | 367 | 356 | 345 | 410 | 389 | 439 |
| ISO 179 1eU [kJ/m²] after storage in FAM B | 12 | 14 | 13 | 13 | 15 | 11 | 32 |

The molding materials according to the invention are distinguished by high flowability, high strength and high toughness. Surprisingly, the molding materials according to the invention also have improved resistance to FAM B.

The invention claimed is:

1. A thermoplastic molding material comprising the following components:

(A) 15 to 80% by weight of at least one polyarylene ether, (B) 5 to 70% by weight of at least one polyarylene sulfide, (C) 0 to 15% by weight of at least one functionalized polyarylene ether comprising carboxyl groups, (D) 15 to 70% by weight of at least one fibrous or particulate filler and (E) 0 to 40% by weight of further additives and/or processing assistants, the ratio of the apparent viscosity of the component (A) to that of the component (B) is from 2.5 to 3.7, wherein the apparent viscosity is determined at 350° C. and a shear rate of 1150 s⁻¹ using a capillary viscometer with a circular capillary having a length of 30 mm, a radius of 0.5 mm, and a nozzle inflow angle of 180°, a diameter of the melt reservoir vessel of 12 mm and with a preheating time of 5 minutes, and the sum of the % by weight of the components (A) to (E) does not exceed 100% by weight, wherein the apparent viscosity of the component (A) is from 100 to 500 Pa·s at 350° C. and a shear rate of 1150 s⁻¹, and wherein the apparent viscosity of the component (B) is from 25 to 200 Pa·s at 350° C. and a shear rate of 1150 s⁻¹.

2. The thermoplastic molding material according to claim 1, wherein the ratio of the apparent viscosity of the component (A) to that of the component (B) is from 2.6 to 3.5.

3. The thermoplastic molding material according to claim 1, wherein the polyarylene ethers of the component (A) are composed of building blocks of the general formula I:

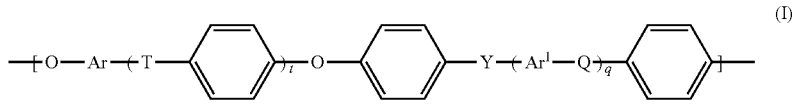
(I)

in which the symbols t, q, Q, T, Y, Ar and $Ar^1$ have the following meanings:

t and q: independently of one another, 0, 1, 2 or 3,

Q, T and Y: independently of one another, in each case a chemical bond or —O—, —S—, —SO$_2$—, S=O, C=O, —N=N— and —CR$^a$R$^b$—, in which R$^a$ and R$^b$ may be identical or different and, independently of one another, are each a hydrogen atom or a $C_1$-$C_{12}$-alkyl, $C_1$-$C_{12}$-alkoxy or $C_6$-$C_{18}$-aryl group, and in which at least one of Q, T and Y is —SO$_2$—, and Ar and $Ar^1$: independently of one another, an arylene group having 6 to 18 carbon atoms.

4. The thermoplastic molding material according to claim 3, wherein Q, T and Y in formula I, independently of one another, are selected from the group consisting of -O- and —SO$_2$— and at least one of Q, T and Y is —SO$_2$—.

5. The thermoplastic molding material according to claim 3, wherein Ar and $Ar^1$ in formula I, independently of one another, are selected from the group consisting of 1,4-phenylene, 1,3-phenylene, naphthylene and 4,4'-bisphenylene.

6. The thermoplastic molding material according to claim 3, comprising a functionalized polyarylene ether comprising carboxyl groups, where the functionalized polyarylene ether comprising carboxyl groups comprises building blocks of the general formula I and building blocks of the general formula II:

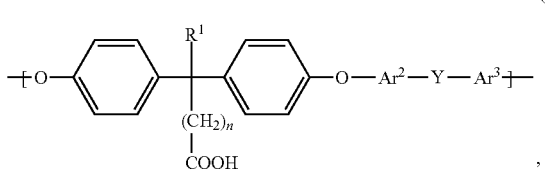
(II)

in which
n is 0, 1, 2, 3, 4, 5 or 6,
$R^1$ is hydrogen, a $C_1$ to $C_6$-alkyl group, or —(CH$_2$)$_n$—COOH, $Ar^2$ and $Ar^3$ may be identical or different and, independently of one another, are a $C_6$ to $C_{18}$-arylene group and Y represents a chemical bond or group selected from —O—, —S—, —SO$_2$—, S=O, C=O, —N=N— and —CR$^a$R$^b$—, in which R$^a$ and R$^b$ may be identical or different and, independently of one another, are each a hydrogen atom or a $C_1$-$C_{12}$-alkyl, $C_1$-$C_{12}$-alkoxy or $C_6$-$C_{18}$-aryl group.

7. The thermoplastic molding material according to claim 6, wherein the proportion of building blocks according to the general formula II, based on the sum of the building blocks according to formula I and formula II, is from 0.5 to 3 mol %.

8. The thermoplastic molding material according to claim 6, wherein the proportion of building blocks according to the general formula II, based on the sum of the building blocks according to formula I and formula II, is from 0.6 to 2 mol %.

9. The thermoplastic molding material according to claim 6, wherein the viscosity number according to DIN EN ISO 1628-1 of the functionalized polyarylene ethers of the component (C) measured in 1% strength by weight solution in N-methyl-2-pyrrolidone at 25° C. is from 45 to 65 ml/g.

10. The thermoplastic molding material according to claim 6, wherein $Ar^2$ and $Ar^3$ is 1,4-phenylene and Y is SO$_2$.

11. The thermoplastic molding material according to claim 1, wherein the polyarylene sulfides of the component (B) are composed of from 30 to 100% by weight of repeating units according to the general formula —Ar—S—, in which Ar is an arylene group having 6 to 18 carbon atoms.

12. The thermoplastic molding material according to claim 1, wherein component (B) is polyphenylene sulfide.

13. The thermoplastic molding material according to claim 1, wherein component (B) is poly(1,4-phenylene sulfide).

14. The thermoplastic molding material according to claim 1, component (D) consisting of glass fibers.

15. A process for the preparation of the thermoplastic molding materials according to claim 1, comprising the mixing of the components used at elevated temperature.

16. A process for the production of shaped articles which comprises utilizing the thermoplastic molding materials according to claim 1.

* * * * *